ated engine braking engine speed. The hold pressure may also be provided by a detent throttle control and provide the same or an intermediate degree of hold shifting to provide separate controls for performance and braking shifting.
United States Patent [19]
Lentz

[11] 3,886,819
[45] June 3, 1975

[54] TRANSMISSION SHIFT CONTROL
[75] Inventor: Carl A. Lentz, Mooresville, Ind.
[73] Assignee: General Motors Corporation, Detroit, Mich.
[22] Filed: Nov. 5, 1973
[21] Appl. No.: 412,866

[52] U.S. Cl. .................. 74/868; 74/864; 74/867; 74/869
[51] Int. Cl. .................................. B60k 21/00
[58] Field of Search .............. 74/868, 869, 864, 867

[56] References Cited
UNITED STATES PATENTS

| | | | |
|---|---|---|---|
| 3,442,152 | 5/1969 | Chana | 74/869 |
| 3,587,355 | 6/1971 | Schaefer et al. | 74/868 |
| 3,670,599 | 6/1972 | Nagamatsu | 74/869 |
| 3,691,872 | 9/1972 | Schaefer et al. | 74/864 |

Primary Examiner—Samuel Scott
Assistant Examiner—P. S. Lall
Attorney, Agent, or Firm—A. M. Heiter

[57] ABSTRACT

A multiratio transmission having an automatic shift control system having a shift valve controlled by output speed and torque demand providing with increasing torque demand upshift at increasing output speeds and downshifts at output speeds having a higher rate of increase. The hysteresis difference between the upshift speed and downshift speed decreases with increasing torque demand to a predetermined minimum automatic shift hysteresis difference at full torque demand. The shift valve is also manually controlled by a hold pressure manually controlled by the selector valve and acting on an area of the shift valve to provide a downshift at maximum power engine operating speed in the lower ratio, an engine speed slightly above the automatic upshift engine speed, and acts on a larger area on downshift to provide a hold hysteresis larger than the automatic shift hysteresis to provide an upshift at the engine speed providing maximum operating engine braking engine speed. The hold pressure may also be provided by a detent throttle control and provide the same or an intermediate degree of hold shifting to provide separate controls for performance and braking shifting.

13 Claims, 6 Drawing Figures

TRANSMISSION SHIFT CONTROL

BACKGROUND OF THE INVENTION

This invention relates to multiratio automatic transmission shift control systems of the type shown in U.S. Pat. No. 3,691,872, Robert H. Schaefer and Joseph R. Fox, patented Sept. 19, 1972 employing the speed and torque demand controlled shift valve shown in U.S. Pat. No. 3,587,355, Robert H. Schaefer patented June 28, 1971. U.S. Pat. No. 3,587,355 explains in detail, with reference to the structure and the FIG. 4 chart, a shift control system having three operating phases, an automatic speed and torque demand actuated automatic upshift and downshift points maximum output speed and torque demand through detent throttle position actuated detent upshift and downshift points and manual selector valve actuated hold upshift and downshift points. The maximum automatic shift point, the detent shift points and the hold shift points are respectively in high ranges of output speed and have the same hysteresis or the same output speed difference between the upshift and downshift speed in each phase.

SUMMARY OF THE INVENTION

The invention relates to transmissions and particularly transmission shift controls.

The shift control system has a shift valve movable between a downshift and an upshift position under the control of an output speed governor pressure force acting in an upshift direction and a net torque demand modulated force, a spring force reduced by the modulator pressure, acting in a downshift direction for automatic shifting. The downshift modulated force, when acting to oppose an upshift, progressively increases at a low rate with torque demand and when acting to provide a downshift progressively increases at a higher rate with increasing torque demand and at full torque demand the main line hysteresis force provides a small difference between the modulated force opposing an upshift and the modulated force acting to downshift. These controls provide upshifts and downshifts at progressively increasing output speeds converging with increasing torque demand to provide at full torque demand an upshift at the output speed providing in the low ratio maximum power or governed engine speed and a downshift at a slightly lower output speed for maximum performance automatic shifting.

In addition to the automatic shifting, the shift valve system provides manually selected shifting for maximum performance and for maximum engine braking in the low speed drive. The shift valve assembly in addition to being responsive to output speed, torque demand and automatic or main line hysteresis for automatic shifting is responsive to a manual shifting pressure, output speed and main line hysteresis for manual shifting. The manual downshift is above the automatic downshift by the automatic hysteresis value and the required tolerance value of output speed so that a manual downshift is provided up to the manual downshift engine speed, providing operation in the lower ratio at maximum power or governed engine speed for maximum performance drive.

On a manual downshift, a very significantly larger manual hysteresis is provided to hold the transmission in the lower ratio drive throughout the range of engine braking up to the maximum operative engine braking speeds.

The manual shifting phase is preferably provided by a manual selector valve having a drive position for establishing automatic shifting and a hold position for establishing hold manual shifting. The selector valve in automatic drive position completes the supply of the main line pressure and torque demand modulator and speed governor pressures to the shift valve assembly for automatic shifting and in the hold position disables the torque demand modulator control for automatic shifting and provides a hold pressure to a manual pressure responsive portion of the shift valve assembly for hold shifting. In the hold position an additional hold pressure is provided which disables the modulator control means and in the upshift position acts on a small area of the shift valve for a downshift and in the downshift position acts on a large area of the shift valve to oppose an upshift. The manual shift means has a chamber between the shift valve element and another element, the control valve element. The chamber has a small area portion and a large area portion. The shift valve controls the manual pressure by providing in the upshift position full manual pressure flow and thus pressure to a small area portion of the chamber to act on the small area and restricted flow to a large area portion of the chamber having a less restricted exhaust flow to provide a very low pressure in the large area chamber portion acting on the shift valve. In the downshift position the inlet flow to the large area chamber is less restricted than the outlet flow so full pressure is provided in the large chamber to provide a high hysteresis. In one embodiment, the smaller and larger inlet flow to the large chamber as compared to the restricted exhaust from the large chamber is provided by a small and a large restriction between relatively axially movable cylindrical surfaces on the shift valve element and another element. In another embodiment, this control is provided by two transverse plane surfaces one on the shift valve element and another on another element.

In a modification, a through detent valve provides a manual detent pressure for the same type maximum performance downshifting. Then the hold pressure may be set higher to provide an engine braking downshift above engine full power or governed speed for engine braking and hold the downshift to maximum operative engine braking speed.

Figures 1, 2:
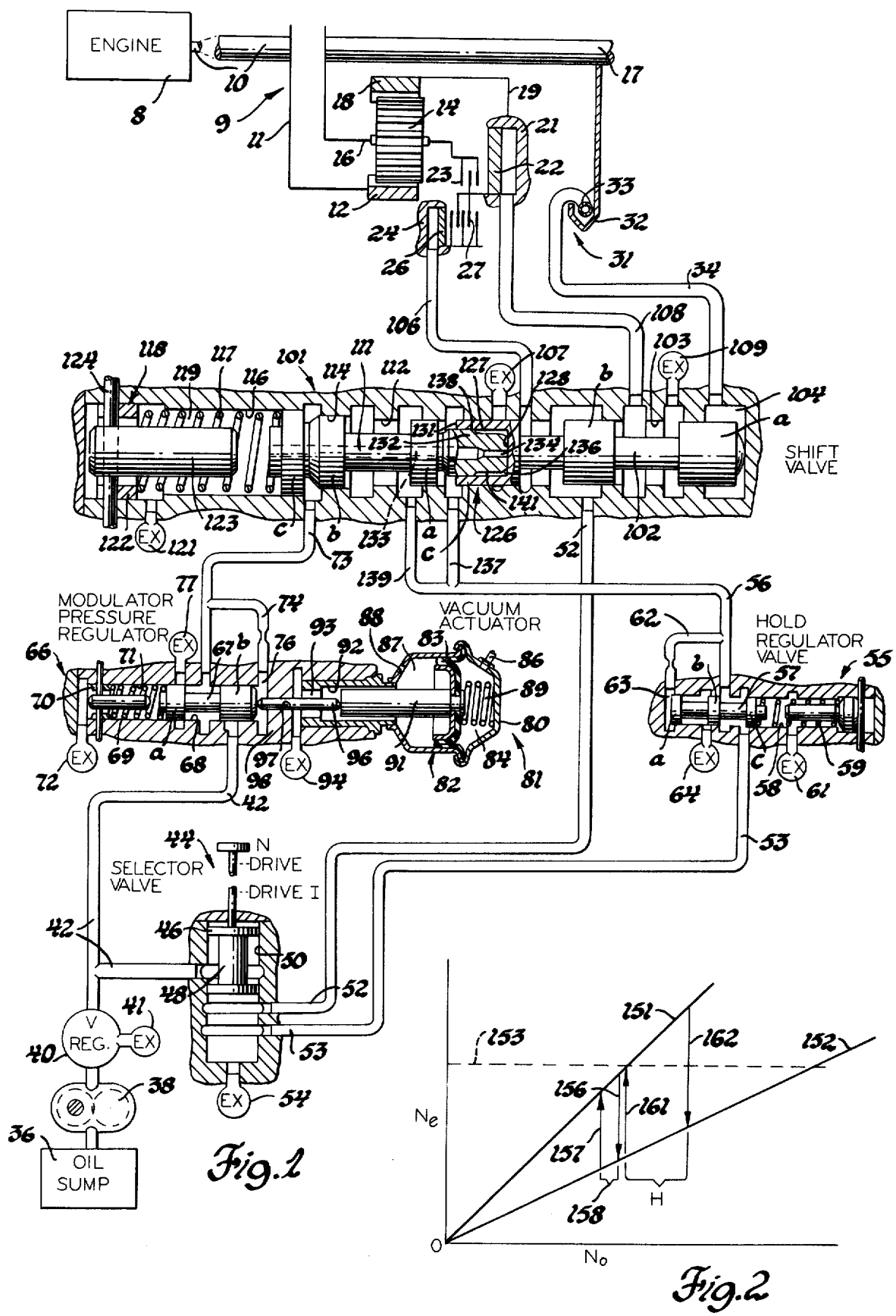
FIG. 1 schematically shows a transmission and control system having automatic and hold shifting phases.
FIG. 2 is a shift chart showing the shift points on a plot of engine speed and output speed for the FIG. 1 system.

This invention is an automatic speed change transmission employs a multi-speed transmission drive providing two or more speeds as shown in further detail in U.S. Pat. No. 3,587,355 Robert H. Schaefer patented June 28, 1971 and U.S. Pat. No. 3,691,872 Robert H. Schaefer and Joseph R. Fox patented Sept. 19, 1972, both incorporated herein by reference. The transmission drive is illustrated in FIG. 1 by the simple two speed gear unit 9 driven by an engine 8 providing an engine manifold vacuum signal which varies as a function of torque demand. The engine may have a throttle pedal for manual control of fuel feed, a manual fuel feed with an engine speed limiting governor or a speed governor controlling fuel feed for constant engine output speed which may be varied by a speed control pedal similar to the throttle pedal. The input shaft 10 drives the input drum 11 and ring gear 12 which meshes with the planetary pinions 14 rotatably mounted on the carrier 16 which drives the output shaft 17. The pinions 14 mesh with the control sun gear 18 which is drive connected to sleeve shaft and drum 19 which has a rotating cylinder 21. When fluid pressure is supplied to the cylinder 21, the piston 22 therein moves to engage the clutch 23 to connect the carrier 16 and sun gear 18 to lock up the gear set for a 1:1 drive.

The sun gear 18 is also connected by the shaft and drum 19 to the rotary plates of the brake 27. When fluid is supplied to the fixed cylinder 24 to move the piston 26 to engage the fixed and rotary plates of brake 27, the sun gear 18 is held to provide a reduction or low speed drive.

A suitable governor, such as pitot governor 31, provides a governor signal pressure proportional to output shaft speed in the governor signal line 34. The governor 31 is illustrated as a pitot tube governor having an annular can 32 mounted for rotation with the output shaft 17. The can is filled with fluid from the lubrication line, not shown. Rotation of the body of fluid in the annular can or trough 32 impinges on the pitot tube end 33 and provides in line 34 the governor signal pressure. Other governors such as the multistep governor shown in U.S. Pat. No. 3,691,872 may be used.

In the automatic control system, exhausted oil from the control system and lubrication system returns to the sump 36 in the base of the transmission housing and is delivered by an input driven pump 38 or a combination of input and output driven pumps. The pump 38 delivers the fluid under pressure to the regulator valve 40 which connects excess fluid to exhaust 41 or provides a secondary converter and lubrication feed and regulates the pressure of fluid in the main line 42. The selector valve 44 has a valve element 46 having a recess 48 between two lands and is mounted for reciprocal movement in the bore 50. In the neutral position N, shown, the main line 42 is blocked and the drive line 52 and drive 1 line 53 are connected to exhaust 54.

When the valve is moved to the drive position, main line 42 is connected to drive line 52 and drive 1 line 53 remains connected to exhaust 54. In the drive 1 position, main line 42 is connected to drive line 52 and drive 1 line 53.

HOLD REGULATOR VALVE

The hold regulator valve 55 regulates the main line pressure, i.e., 100 to 150 psi, supplied by the drive one line to the hold feed line 56 at a lower pressure, i.e., 45 psi, and has a valve element 57 having equal diameter lands $a$, $b$ and $c$ reciprocating in bore 58. A spring located in a spring chamber vented by exhaust 61 biases the valve 56 to the open position shown. In the open position shown, the drive 1 line 53 is connected through the space between lands $b$ and $c$ and supplies hold line 56 which is connected to the shift valve. This hold pressure supply line 56 is also connected by restricted passage 62 to the closed chamber 63 at the end of bore 58 to act on land a of the valve element to oppose the spring bias. The hold pressure in chamber 63 moves the valve against the spring to connect line 53 to exhaust 64 or hold line 56 to regulate hold pressure at a value, i.e., 45 psi, less than main line pressure.

MODULATOR PRESSURE REGULATOR

The modulator pressure regulator 66 provides a pressure inversely proportional to torque demand and has a valve element 67 having equal lands $a$ and $b$ mounted in a bore 68. The spring 69 is seated on adjustable abutment 70 shown in detail in the above U.S. Pat. No. 3,587,355 and is located in a spring chamber 71 vented by exhaust 72 biasing the valve element from the closed position shown to the open position connecting main line 42 between the lands to the modulated signal line 73 which is connected by a restrictive branch passage 74 to the chamber 76 at the end of the bore 68 to act on the end of land $b$ to bias the valve element to oppose the spring, to block main line 42 and to connect modulator line 73 between lands $a$ and $b$ to exhaust 77 to regulate the modulated signal pressure inversely proportional to torque demand on the engine or the force delivered by vacuum actuator 81.

The modulator pressure regulator valve 66 is controlled by a vacuum actuator 81 consisting of a container 82 fixed to the valve body and having a flexible diaphragm 83 therein dividing the container into a vacuum chamber 84 connected by the pipe 86 to the engine manifold vacuum and having an atmospheric chamber 87 connected to atmosphere by the apertures 88. The diaphragm 83 is biased by a spring 89 in the vacuum chamber and is secured to an actuator stem 91 which passes through a bore or aperture in the container 82 and is reciprocally mounted and may be guided in bore 92 in the valve body. Chamber 93 portion of bore 92 is vented by exhaust 94. The stem 91 engages a pin 96 reciprocally mounted in a bore 97 in a wall 98 of the valve body between bores 68 and 92 to engage the valve element. The vacuum actuator force is thus transmitted by stem 91 and pin 96 to valve element 67. The actuator force is the constant force of actuator spring 89 modified by the difference between the atmospheric pressure force and absolute vacuum pressure force on the diaphragm. Since engine vacuum is inversely proportional to torque demand, the actuator force increases with increasing throttle opening or torque demand and acts through the stem 91 and pin 96 on the valve element 67 and with the regulated pressure in opposition to the valve spring 69 to provide a regulated pressure proportional to vacuum and inversely proportional to actuator force, torque demand and throttle opening.

The above U.S. Pat. No. 3,587,355 explains in detail how this type modulator valve provides an inverted modulator pressure that is maximum at idle, and remains maximum for a small range of low throttle openings where the vacuum actuator 81 does not provide a force because maximum idle vacuum provides a differential of atmospheric pressure force and vacuum pressure force completely overcoming the spring 89 and for a small additional throttle travel due to the effect of the inverted modulator pressure in chamber 76 acting on the small end of the pin 96 and opposing the force of the vacuum actuator a small initial increment of vacuum actuator force does not reduce modulator pressure. Thus the inverted modulator pressure at very low throttle values is maximum and constant and accurately determined by the spring force, land area and pin area at low throttle values where vacuum does not accurately represent torque demand and to accommodate for tolerance variations of the regulated modulator pressure. Then increasing actuator force acting on pin 96 assists modulator pressure to oppose the regulating force of the spring 71 and reduces the inverted modulator pressure in a proportional manner with increasing throttle opening or torque demand, and reaches zero value just before the vacuum actuator force reaches maximum value due to the excess of vacuum actuator force over the force of spring 69 and remains at zero value in the remaining range of high throttle values to full throttle. The inverted modulator pressure is reduced to zero just before the vacuum actuator force reaches a maximum so that inveted modulator pressure is always zero at full throttle notwithstanding tolerance variations and vacuum variations resulting, for example, from altitude changes.

The shift valve 101 has a shift valve element 102 having lands $a$, $b$ and $c$ located in a stepped bore 103. The land $a$ is slightly smaller than the land $b$ so pressure therebetween provides primary hysteresis. Lands $b$ and $c$ are the same diameter. Governor pressure in line 34 enters chamber 104 to act on the end of land $a$ to urge the shift valve element 102 from the downshift position shown to the upshift position. In this downshift position, main line pressure in drive line 52 is connected between lands $b$ and $c$ to the low brake apply line 106 establishing low drive. Exhaust 107 prevents leakage across land $c$. The high clutch apply line 108 is connected between lands $a$ and $b$ to exhaust 109 disestablishing high. This places the transmission unit in the low speed drive. On an upshift the shift valve element connects drive line 52 between lands $a$ and $b$ to the high clutch apply line 108 and blocks exhaust 109 to establish high drive. The low brake apply line 106 is connected between lands $b$ and $c$ to exhaust 107 to disestablish low drive. Thus the transmission is in high drive. The shift valve may also be a shift signal valve providing a signal controlling a shift relay valve and trimmer valves may be used as shown in the above U.S. Pat. No. 3,691,872. The control valve 111 has three lands $a$, $b$ and $c$ of progressively increasing diameter respectively mounted in small bore 112, intermediate size bore 114 and large bore 116. A spring 117 seated on an adjustable abutment 118 described in the above U.S. Pat. No. 3,587,355 and located in spring chamber 119 portion of bore 116 which is vented by exhaust 121, acts on the control valve 111 which acts on the shift valve to bias both valves in a downshift direction in all valve positions. The adjustable abutment 118 has an abutment ring 122 and a stop member 123 respectively secured in one of several adjustment positions and secured in one position by a pin 124 to the valve body. The inverted modulator pressure in line 73 is connected to the step between the bores 114 and 116 so inverted modulator pressure acts on the unbalanced area of land $c$ of control valve element 111, the area of land $c$ less the area of land $b$, to provide a torque demand force in an upshift direction opposing the spring force in all valve positions. When the control valve element is upshifted to upshift position, inverted modulator pressure line 73 is also connected between lands $a$ and $b$ and acts on the unbalanced area of larger land $b$ to provide a second force in an upshift direction opposing the spring force. With the engine 8 running to provide main line pressure, the selector valve 46 in drive position providing drive line 52 pressure and the modulator pressure regulator providing inverted modulator line 73 pressure, the system is conditioned for automatic output speed and torque demand shifting by shift valve 101. With the control valve 111 and shift valve 102 in the downshift position shown, when governor pressure in chamber 104 overcomes the net downshift modulated force, the spring bias force as reduced by the upshift inverted modulator force provided by inverted modulator pressure acting on the unbalanced area of land 111$c$, both valves upshift to high position connecting low brake apply line 106 to exhaust 107 and drive line 52 to high clutch apply line 108 for a shift from low to high speed drive. On this upshift, the net downshift modulated force is modified to provide reduced net downshifting modulated force which includes the same forces and an additional reducing inverted modulator force provided by inverted modulator pressure acting on the unbalanced area of land $b$ of the control valve element 111. Main pressure is also supplied between lands 102 $a$ and $b$ for the high clutch and acts on the unbalanced area of land $b$ of shift valve 102 to provide a primary hysteresis force opposing the spring 117 or assisting the governor to decrease the downshift speed. Both the shift and control valves 102 and 111 downshift when the net downshifting modulated force overcomes the upshift forces provided by the governor pressure and primary hysteresis.

During the above automatic shifting operation the shift valve 102 and the control valve 111 are always biased by the speed force and the net modulated force into contact with the end of piston 132 engaging base 128 of cylinder 127 of the hold actuator means 126 on the adjacent ends of these valves.

Figure 4:
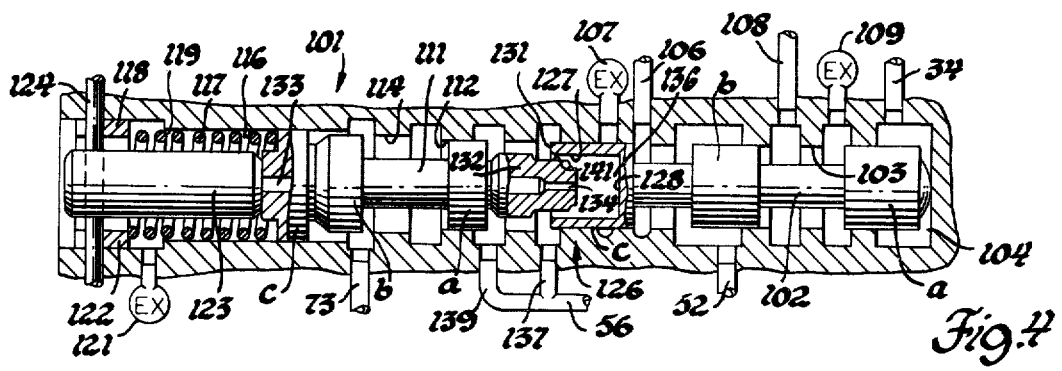
FIG. 4 shows the automatic shift valve in hold position.

The hold pressure actuator means has a cylinder 127 in the land $c$ of shift valve 102 extending from the free end of the land to the cylinder bottom or base 128. This land $c$ thus has a large base area 128 and a small cylindrical sleeve area 131. The control valve 111 has a piston 132 extending from the free end of land 111$a$ and slidably fitting in the cylinder 127. A passage 133 having a restriction portion 134 extends completely through the control valve 111 from the chamber 136 between the cylinder 127 and piston 132 to the spring chamber 119 vented by exhaust 121. The passage 133 normally includes radial grooves in the end face adjacent land 111$c$ of control valve 111, so when the upshifted control valve engages stop 123, as in FIG. 4, the passage 133 is not sealed but remains connected to exhaust 121. With the shift valve 102 and control valve 111 in the downshift position, FIG. 1, the hold feed line 56 is connected by branch 137 to the space in the bore between lands 102$c$ and 111$a$ and flows through the clearance space, a small restricted passage, 138 between the internal cylindrical surface of cylinder 127 and the external cylindrical surface of piston 132 to the chamber 136 and then exhausts through the larger intermediate size restriction 134 providing a very low pressure, i.e., ½ to 3 psi, in chamber 136. Flow between the end face of piston 132 and cylinder base 128 is not blocked as the pressure slightly separates the valve sufficiently to provide the described operation, but sealing at this end face may be positively prevented by radial grooves as at the other end of the control valve. Hold pressure supplied by branch 137 acting on the differential area of land 111a less the area of piston 132 is sufficient to upshift the control valve 111 against spring 117 without modulator pressure but is also assisted by the very low pressure in chamber 136 and hold presure connected by branch 139 between lands 111a and 111b to act on the unbalanced area of land 111b, all effective to upshift control valve 111. When the control valve 111 upshifts in response to hold pressure, hold pressure is continuously connected to the space between lands 102c and 111a by either branch 137 or 139 due to the axial spacing of the branch ports and length of the lands and also since bore 112 is larger than bore 103. On such upshift of control valve 111 the space between lands 111a and b and the space between lands 111b and c is connected to inverted modulator line 73 providing modulator pressure. If the hold pressure on the small cylindrical sleeve area 131 of land c of the shift valve 102 provides a hold downshift force less than the governor pressure upshift force the shift valve 102 upshifts with the control valve 111. Since this hold downshift force is greater than the governor force when the shift valve is downshifted, the control valve upshifts and the shift valve 102 remains downshifted as shown in FIG. 4. Then hold pressure feeds through a large restricted passage 141 provided by grooves in piston 132 or a reduced piston portion. Since restricted passage 141 is substantially larger than restricted exhaust passage 134 substantially full hold pressure is provided in chamber 136 and acts on cylindrical sleeve area 131 and base area 128 or the full area of land 102c to provide a substantially higher force resisting an upshift to hold shift valve 102 downshifted up to a substantially higher speed. At such speed an upshift will occur, restoring or re-establishing small restriction 138 so intermediate size vent restriction 134 reduces the pressure in chamber 136 to a very low or zero value and hold pressure only acts on the small area 131 of land 102c so a downshift can only be made at a substantially lower speed.

OPERATION

With the engine running providing manifold vacuum which varies inversely with throttle position or torque demand and the pump 38 providing regulated pressure in main line 42, vacuum modulator valve 66 provides inverted modulator pressure in line 73 which has a constant maximum value in a small range of low torque demand values and decreases with increasing torque demand and is zero in a small range of maximum torque demand values. When the selector valve 44 is moved from neutral to the drive position, main line pressure is connected by drive line 52 and shift valve element 102 in the downshift position to apply low brake 27 for low speed drive and the shift valve conditioned for speed and torque demand automatic shifting.

With the shift valve element 102 and control valve element 111 in the downshift position shown, the spring 117 provides a constant downshift bias force reduced by the inverted modulator pressure in line 73 acting on the differential area of land c of control valve element 111, an upshift opposing or downshift net modulated force. The downshift net modulator force increases inversely with respect to the inverted modulator pressure to provide upshifts at progressively increasing speeds with increasing torque demand.

When the shift valve 102 upshifts, the spring bias force is reduced by inverted modulator pressure acting on the differential area of land 111c and inverted modulator pressure in addition on the differential area of land 111b and by the main line pressure primary hysteresis on the differential area of shift valve land 102b to provide a lower downshift modulator biasing force always less than but increasing at a higher rate than the upshift modulator biasing force. Thus the governor pressure or speed at which the transmission downshifts at each torque demand setting, is always less than the upshift speed, but increases at a faster rate with increasing torque demand so the differential between up and downshift speeds decreases with increasing torque demand. This difference between the upshift and downshift speeds is large at low torque demand values where each speed drive may be used in a larger range of output speeds for optimum pleasability and provide performance commensurate with low torque demand requirements. With increasing torque demand the range of output speeds in each drive ratio gradually decreases to a minimum value determined only by the primary hysteresis force and only sufficient to prevent hunting to provide performance commensurate with torque demand.

FIG. 2 shows a typical plot of engine speed Ne or transmission input speed against output speed No for a low speed drive 151 and a high speed drive 152 like in transmission 9 and the governed or rated engine speed for maximum engine power 153. At full throttle the upshift speed is selected so that when the transmission is operating in low speed, curve 151, the upshift occurs as indicated by arrow 156 at an engine or input speed substantially equal to and preferably a little less than the engine or input speed for maximum engine power 153. The difference as shown in FIG. 2 is sufficient so that, notwithstanding tolerance variations of the engine governor and/or the transmission governor, the upshift speed does not exceed the engine governed speed or the speed for maximum power 153. The full throttle downshift occurs at an output speed only sufficiently less to prevent objectionable hunting as indicated by arrow 157. The output speed difference 158 between upshift 156 and downshift 157 at full throttle is determined solely by main line primary hysteresis. The automatic shifting operation is further described in the above U.S. Pat. No. 3,587,355.

When selector valve 44 is in the drive 1 position, a hold pressure regulated by hold regulator valve 55 is supplied by hold feed line 56 and branches 137 and 139 to the shift valve.

The hold pressure acts on the control valve element 111 to upshift or retain the control valve element in the upshift position. On selecting hold when the shift valve is in an automatic upshift position hold pressure via branch 139 acts on the differential area of land 111a relative to piston 132 to hold the control valve element 111 in the upshifted position and will act on the small area 131 of cylindrical sleeve land 102c to urge a downshift against the governor pressure and primary hysteresis pressure. The very low pressure in chamber 136 adds a very small downshift force. The hold pressure and area 131 are calibrated to provide a downshift from high ratio 152 at an output speed to provide maximum power engine speed 153 in the lower ratio 151 as indicated by hold downshift arrow 161. The hold downshift occurs at essentially the same output speed as the automatic upshift, but the design position is at the crossover point of the low speed curve 151 and the rated engine power speed curve 153 since tolerance variation will not prevent or adversely affect this downshift. This hold downshift thus provides a performance gain and is like the through detent downshift of the above Schaefer U.S. Pat. No. 3,587,355.

When the hold pressure is applied with the shift valve 102 in the downshift position, the control valve 111 is upshifted so the shift valve and control valve are positioned in the same manner as after a hold downshift as shown in FIG. 4. Then hold pressure acts on end area 131 of cylindrical sleeve land 102c and flows through large restriction grooves 141 to develop substantially full pressure in chamber 136 to act on base area 128 because the smaller restiction 134 limits outlet exhaust flow. Thus, substantially full hold pressure acts on the entire area of land 102c and prevents an upshift of shift valve 102 until a substantiallly higher speed when an upshift is permitted as indicated by arrow 162. Thus the hold control holds the transmission in the lower ratio for vehicle braking by the engine up to a speed where it is no longer advantageous for vehicle braking purposes to hold the transmission in the lower ratio drive. This shift effects the function of the hold upshift of the above Schaefer U.S. Pat. No. 3,587,355. Thus the output speed difference between the automatic up and down shifts 156 and 157 at full throttle is small, a predetermined minimum to prevent hunting and provide maximum performance, full throttle automatic shifting, while the difference between the hold up and down shifts 162 and 161 is large to provide and hold downshift at the output speed providing maximum performance in the lower ratio, to hold the transmission in the lower ratio drive for a full range of engine vehicle braking and provide a hold upshift above a vehicle speed where engine braking in the lower ratio drive is no longer advantageous.

MODIFIED SYSTEM

Figure 3:
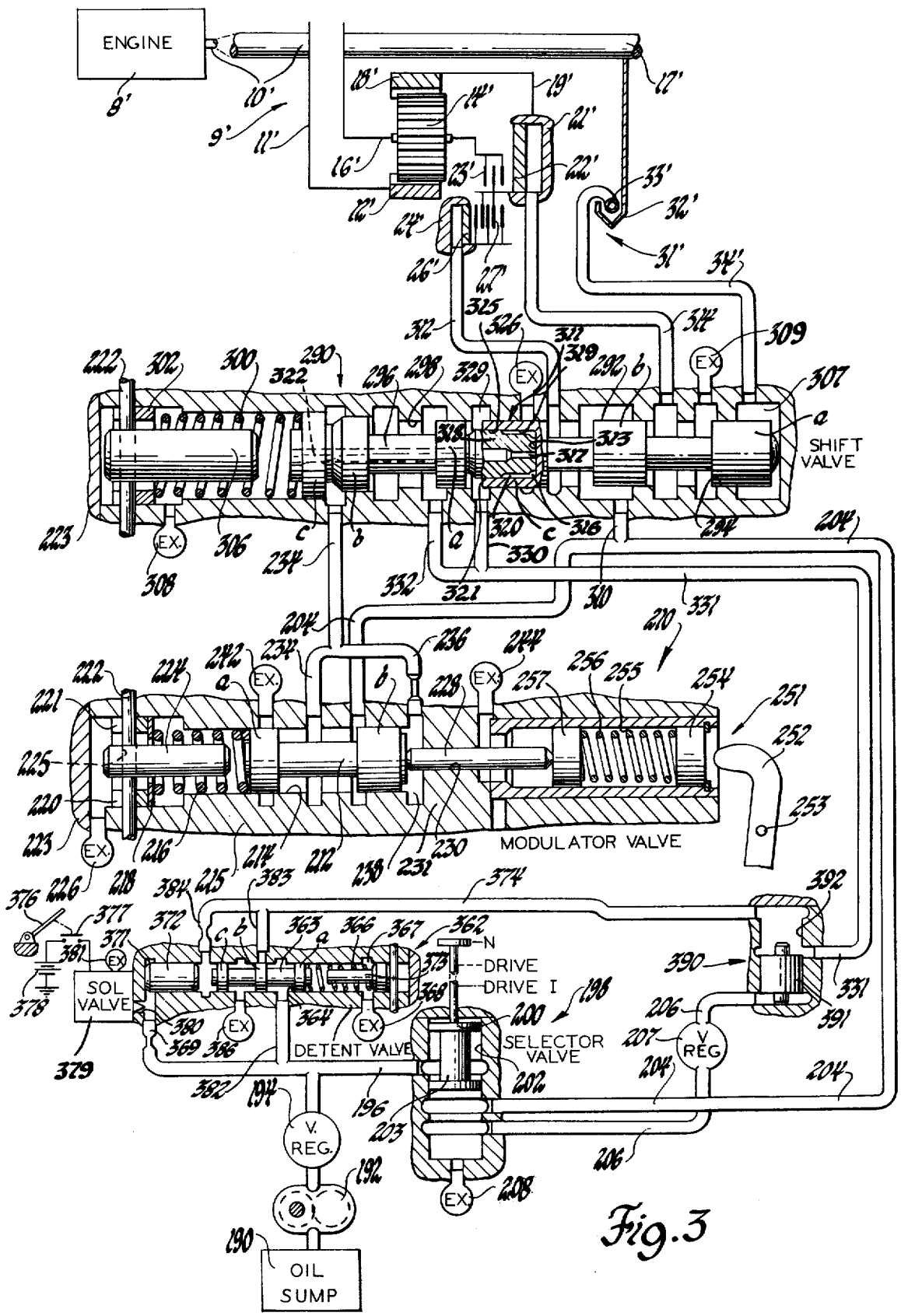
FIG. 3 schematically shows a transmission and control system having automatic, detent and hold shifting phases.

The modified automatic multi-speed transmission and control system, in FIG. 3, is like the above described two speed unit 9 and governor 31 so the same reference numerals primed have been used. Exhaust fluid from the control and lubrication system returns to the sump 190 and is delivered by the input driven pump 192 at a pressure regulated by the regulator valve 194 to the main line 196. A manual selector valve 198 has a valve element 200 slidable in bore 202 and having a recess 203 which, in the neutral position shown, blocks passage from the main line 196 and connects the drive line 204 and the drive 1 line 206 to exhaust 208. In the drive position, the main line is connected to the drive feed line 204 and in the drive 1 position, is connected to both the drive feed line 204 and the drive 1 feed line 206. Hold regulator valve 207, constructed like the above hold regulator valve 55, regulates drive 1 pressure at a lower value, i.e., 45 psi than main line pressure regulator valve, i.e., 100 to 150 psi.

The inverted modulator valve 210 provides a pressure inversely proportional to torque demand. Modulator valve 210 has a valve element 212 having equal diameter lands a and b located in a bore 214 in body 215. The valve element is biased in a pressure increasing direction by a biasing spring 216 which seats against a spring seat washer 218 abutting the adjustable spring seat ring 220 which is held in any one of several aperture positions by a pair of recesses 221 seated on fastener pin 222 as described in the above U.S. Pat. No. 3,587,355. Fastener pin 222 also extends through aperture 225 to support stop pin 224 which prevents excessive valve movement, excessive spring compression and guides the spring coils to keep them aligned. If the valve bore is closed by plate 223, the spring chamber is vented by exhaust 226. Land b at the other end of the valve engages a force transmitting strut or pin 228 which is reciprocally mounted in a bore 230 in the end wall 231 of the bore 214.

Though the above described vacuum actuator 81 in FIG. 1 may be used with strut 91 engaging pin 228 to actuate inverted modulator valve 210 to provide inverted modulator pressure, a mechanical actuator 251 has been shown. The mechanical actuator has a lever 252 moved from zero to full torque demand positions by a throttle pedal, a diesel fuel feed rack, a fuel feed control actuated by an engine speed governor, a speed control of a fuel feed governor or other torque demand control devices.

The lever 252 is pivoted by pivot 253 and engages plug 254 slidable in bore 255 to compress spring 256 and act through slidable plug 257 on pin 228 and valve element 212. Bore 255 is vented by exhaust 244. The lever has an initial clearance movement and with increasing torque demand movement compressing spring 256 to similarly provide constant high modulator pressure at low torque demand and reduce modulator pressure to zero just before full torque demand to provide an inverted modulator pressure in line 234.

When main line pressure is supplied by drive line 204 at zero throttle, regulated inverted modulator pressure, a constant pressure determined by the spring 216 and valve area, is supplied to inverted modulator line 234, restricted branch 236 and chamber 238 and excess fluid vented by exhaust 242. When throttle lever 252 moves through the initial lost motion and spring 256 force overcomes the fluid reaction force on pin 228, inverted modulator pressure is reduced with increasing throttle to zero just before full throttle.

This inverted modulator valve functions like the above modulator valve 66 and this modulator valve in the above U.S. Pat. No. 3,587,355 which is referred to for further explanation.

Shift valve 290 has a shift valve element 292 having lands a, b and c located in a bore 294. The valve land a is slightly smaller than the valve land b so that on an upshift the fluid pressure supplied to engage a drive flowing between these lands acts on the larger area of land b to provide a primary hysteresis force acting in the upshift direction. The land c is the same size as land b. The control valve 296 has lands a, b and c of increasing diameter located in a three stepped bore 298. A spring 300 engages the end of contol valve 296, seats on an adjustable seat 302 and is guided by a stop pin 306 both mounted on a pin 222 and constructed and functioning like the above described adjustable seats and stop pins. The exhaust 308 vents the spring chamber.

With the valve in the downshift position shown, drive pressure line 204 is connected by branch 310 between the lands b and c to the low speed drive apply line 312 for the low speed drive. The high speed drive apply line 314 is connected to exhaust 309. The governor pressure in line 34' is connected to the closed chamber 307 at the end of the bore 294 and acts on the land a in an upshift direction. The inverted modulator pressure is supplied by line 234 to the space between lands b and c of control valve 296 and acts on the unbalanced area of land c to provide a bias force on the control valve in an upshift direction reducing the force of spring 300, a net downshift modulated force.

At any torque demand value when the speed of the output shaft has a value providing a governor pressure force greater than the net downshift modulated force, the control valve and the shift valve will upshift together. In upshift position, the drive line 204 is connected by branch 310 between lands a and b to high speed apply line 314 to engage high ratio. The low speed ratio is disengaged by the connection of low speed apply line 312 between lands b and c to exhaust 326.

During the normal automatic shifting operation the hold downshift chamber 329 between the control valve element 296 and the shift valve element 292 is exhausted by branches 330 and 332 of downshift line 331 as described below. When the upshift is completed, the land a of control valve 296 closes branch 332 and the land b uncovers the port of inverted modulator line 234 so that the inverted modulator pressure in addition to acting on the unbalanced area of land c, now also fills the space between lands a and b and additionally acts on the unbalanced area of land b to provide an increased torque demand force acting on the valve in opposition to the spring 300. Also on an upshift, valve 292 has moved to the left, and since land a is smaller than land b, the fluid at main line pressure connected to the high speed apply line 314 provides a priimary hysteresis force in an upshift direction. When the governor pressure force is less than net downshift modulated force at any throttle position, the net downshift force overcomes governor force and a downshift will occur.

The manual downshift means 311 includes the cylindrical sleeve land 292c having a cylinder 319 therein with a base 313 receiving a piston 318 therein. Manual downshift pressure in chamber 329 acts on the differential area of land 296a relative to piston 318 to upshift and hold contol valve 296 upshifted. Hold pressure, when both the control and shift valves 296 and 292 are upshifted, flows through the small clearance restriction 315 between piston 318 and cylinder 319 to chamber 316 and exhausts through intermediate size restriction portion 317 of passage 322 to exhaust 308 to provide a very small pressure in chamber 316 and, when the control valve 296 is upshifted and the shift valve 292 is downshifted flows through large restriction 320 to chamber 316 and then through smaller interediate size restriction 317 to exhaust to substantially provide manual downshift pressure in chamber 316. Thus manual downshift pressure acts only on the sleeve end area 321 in upshift position to provide a small downshift force relative to pressure and in the downshift position on end area 321 and base 313 area, or the full area of land 292c to provide a large downshift force relative to pressure. It will be seen that this shift valve 290 is like the above described shift valve 101 and functions in the same way.

A through detent valve 362, which has a valve element 363 having equal diameter lands a, b, and c located in a bore 364 and is biased in an opening direction by a spring 366 located in the spring chamber 367 in which main line pressure line 196 is vented by exhaust 368. Main line pressure line 196 is connected through restricted passage 369 to a chamber 371 to act on the inactivating piston 372 to normally engage valve element 363 and hold it in the extreme right position against the stop element 373 so that the detent valve does not deliver pressure to the detent line 374. When the throttle pedal 376 is at the full throttle position, it closes switch 377 connecting a grounded power source 378 to the solenoid valve 379 which opens the post 380 to exhaust 381, to vent fluid in chamber 371 to permit the detent valve 362 to regulate pressure. The regulated pressure is supplied from main line 196 via branch 382 to the space between lands a and b to the branch 383 of detent line 374 which is connected by restricted branch 384 to the space between the piston 372 and valve element 363 to initiate regulation of detent line pressure at a predetermined low value, i.e., 30–38 psi, determined by spring 366. Excess pressure will move the valve element 363 against the spring 366 and connect the detent line to exhaust 386.

The shuttle valve 390 connects either detent line 374 or drive 1 line 206 regulated at hold pressure to downshift line 331 and has a valve element 391 slidably in bore 392. The detent line and drive 1 line are connected to opposite ends of the bore. The downshift line is connected to the center of the bore and is open when the valve element is at either end of the bore so either the detent line or the drive 1 line pressure is connected to the downshift line.

OPERATION MODIFIED SYSTEM

Figure 6:
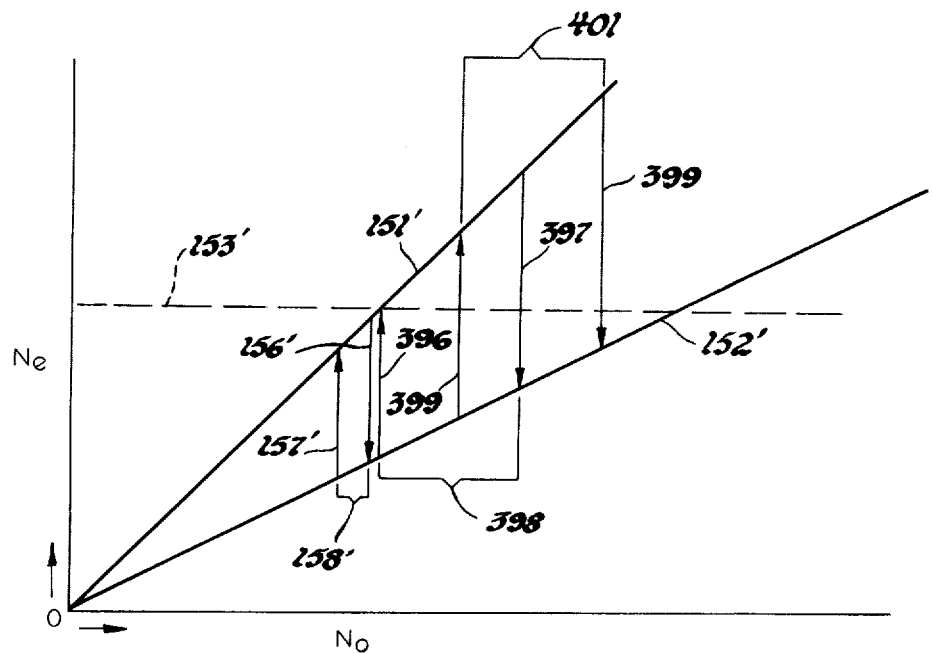
FIG. 6 is a shift chart showing the shift points in a plot of engine speed and output speed for the FIG. 3 system.

This modified system, FIG. 3, provides in the automatic shifting drive position of the selector valve 198 main line pressure in drive line 204 so the modulator valve 210 provides inverted modulator pressure in line 234 for automatic shifting as above described with respect to the FIG. 1 system. The FIG. 6 shift chart for the FIG. 3 system is similarly a plot of engine speed Ne against output speed No with low ratio line 151', high ratio line 152', maximum rated or governed engine speed line 153', upshift arrow 156', downshift arrow 157' and main line hysteresis difference 158' as described above with respect to FIG. 2. The manual downshift means 311, FIG. 3, also functions like the hold downshift means 126, FIG. 1, but may be selectively supplied with the higher hold pressure, i.e., 45 psi or (lower) through detent pressure, i.e., 30 psi.

Manual movement of the throttle 376 or other fuel feed through detent as explained in detail above supplies detent pressure in line 374, which is connected in the absence of hold pressure, to downshift line 331.

When the selector valve 198 is moved to the drive 1 position, the main line 196 in addition to supplying drive line 204, also supplies drive 1 line 206 which is regulated by hold pressure regulator valve 207 so hold pressure is connected by shuttle valve 390, even if the lower detent pressure is present, to downshift line 331, branches 330 and 332 and the space 329 between shift valve 292 and control valve 296.

During automatic operation in drive position, through detent movement of throttle 376 supplies detent pressure to the downshift means 311 of the shift valve assembly 290. If the shift valve is in the upshift position, detent pressure acting on the small area 321 downshifts the shift valve element 292 against governor pressure and primary hysteresis pressure below and at the output speed to provide operation in the lower ratio at the maximum rated power or governed engine speed for maximum performance operation as shown by arrow 396 which is the same as arrow 161. When the shift valve 292 is downshifted, detent pressure acts on the full area of land 292c to hold the shift valve and transmsission downshifted. Since under normal full throttle driving under load, the engine speed does not increase over the maximum power or governed speed, so the output speed will not increase to provide an upshift. However, if there is abnormal full throttle downhill operation the shift valve will upshift to prevent excessive engine speeds as indicated by arrow 397. The detent hysteresis difference 398 is substantially larger than the automatic hysteresis difference 158'.

The selector valve on being moved to hold position provides hold pressure in line 331. As explained in detail above the hold pressure acts on the small area 321 of the downshift means 311 when the shift valve 392 is in the upshifted position against governor and hysteresis pressures up to the output speed providing a downshift for operation in the lower ratio a little above rated or governed engine speed as shown by arrow 399. Thus a downshift may be made at a higher engine overrun speed and higher output speed to provide engine braking in a range of engine speeds slightly above the maximum engine driving speed. When the shift valve is downshifted, hold pressure acts on the full area of land 292c to upshift the transmission at the maximum operative engine braking output speed as shown by arrow 399. The hold hysteresis difference 401 is substantially the same as the detent hysteresis difference 398.

MODIFIED SHIFT VALVE

Figure 5:
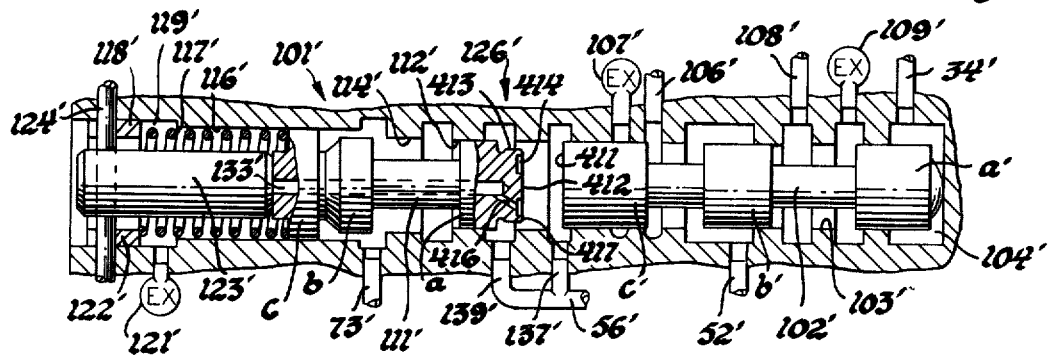
FIG. 5 shows a modified automatic shift valve.

The modified shift valve assembly 101' shown in FIG. 5 has a shift valve 102' and control valve 111' structurally the same as the shift valve assembly 101' shown in FIGS. 1 and 4, so the same reference numerals primed have been used and the operation for automatic shifting will be clear from the above description. The hold pressure downshift means 126' provides the same basic operation function as the FIG. 1 hold pressure downshift means 126 but the control is provided between transverse plane surfaces at the adjacent ends of the shift and control valve elements rather than concentric cylindrical surfaces as in FIG. 1 and 4. The downshift means includes a transverse plane end surface 411 on the end of land 102'c' and a transverse end surface 412 on the facing end of extension portion 413 of land 111'a'. The end surface 412 has an annular groove port 414 therein connected by a restricted portion 416 of the passage 133' extending through control valve 111' to exhaust to chamber 119' and exhaust 121'. The surface 412 has an annular portion 417 completely surrounding the port 414 having a diameter less than the diameter of land 102'c'. When the shift valve 102' and control valve 111' are in the upshift position with surfaces 411 and 412 in contact, hold pressure supplied by line 56' and branch 139' has full flow between extension 413 and acts at full pressure on a small outer annular area of surface 411 of land c', the area of surface 411 less the area of surface 412, to provide a downshift, as in FIG. 1, at the output speed providing maximum performance in the lower ratio at maximum power or governed engine speed as shown by arrow 161. The hold pressure also flows between surface 411 and annular portion 417 of surface 412 to port 414 which provides a small restriction and then through larger restriction 416 to exhaust passsage 133' to provide a very small or minimal pressure between the surfaces 411 and 412. When the shift valve 102' is in the downshift position as shown in FIG. 5, there is full flow to and full hold pressure in the space between the shift valve 102' and control valve 111' due to full inlet flow from hold line 56' and both branches 137' and 139' and limited exhaust flow through restriction 416 so full hold pressure acts on the full area of surface 411 of land 102'c' to provide an upshift at maximum operative engine braking speed in low ratio drive as shown by arrow 162, FIG. 2. The modified shift valve may thus be used in the FIG. 1 system to provide the same type of operation and may also be used in the FIG. 3 modification to provide the same type operation.

It will be apparent that the invention may be modified.

It is claimed:

1. a transmission; multiratio gear means having an input, output, low drive fluid operated means for establishing a low ratio drive between said input and output and high drive fluid operated means for establishing a high ratio drive between said input and output; a source of fluid under pressure; governor means connected to said source and said output providing a governor pressure varying with output speed; torque demand means responsive to engine torque demand providing a torque demand signal varying with torque demand; shift control means including a bore and shift valve means movable in said bore connected to said source, said low and high drive means, said governor means and said torque demand means, operative in a downshift position to connect said source to said low drive fluid operated means, operative in an upshift position to connect said source to said high drive fluid operated means and biased in an upshift direction by said governor signal and having torque demand biasing means movable in said bore connected to said torque demand means and responsive to said torque demand signal operative in a downshift position to engage and provide an upshift resisting bias to said downshifted shift valve means and in an upshift position to engage and provide a downshift bias to said upshifted shift valve means for automatic shifting at increasing and higher upshift speeds and lower downshift speeds with increasing torque demand, said shift valve means and said biasing means having engaging end portions within said bore; and manual downshift means having downshift area means on said engaging end portions and manual downshift fluid supply means selectively manually controlled to supply downshift pressure to said bore to act on said downshift area means of said biasing means to hold said biasing means in said upshift position, to act on one area said downshift area means of said shift valve means when said shift valve means is upshifted to downshift said shift valve means at a higher speed than said automatic downshift, and to act on said downshift area means of said shift valve means when said shift valve means is downshifted to prevent an upshift until a speed substantially higher than said manual downshift speed.

2. The invention defined in claim 1 and said downshift area means having a full flow passage and a first area means on said shift valve means supplied with downshift pressure when the shift valve is downshifted and upshifted to provide a downshift bias, second area means, a restricted exhaust from said second area means, a less restricted connection from said first area means to said second area means when said shift valve means is downshifted to provide high pressure in said second area means and a more restricted connection from said first area means to said second area means when said shift valve means is upshifted to provide reduced pressure in said second area means.

3. The invention defined in claim 1 and said downshift area means including seal means on said end portions forming between the end portions a small area chamber when they are engaged and a large area chamber when they are spaced from each other; said downshift fluid supply being connected to said small area chamber in all positions of said shift valve means and said biasing means to position said biasing means in upshsift position and when said shift valve means is upshifted to act in said small area chamber for downshift at upshift downshift speed and when said shift valve means is downshifted to act in said large area chamber to prevent an upshift up to a substantially higher speed.

4. The invention defined in claim 1 and said downshift area means including an annular seal means on said end portions forming between both end portions when they are engaged an outer area annular chamber and an inner area chamber and when they are spaced from each other a combined area chamber; said downshift fluid supply being connected to said outer chamber in the downshift and upshift positions of said shift valve means and said biasing means operative to position said biasing means in upshift position and when the shift valve means is upshifted to act in said outer area chamber to downshift said shift valve means at downshift speed and when said shift valve means is downshifted to act in both chambers to prevent and upshift up to a substantially higher speed.

5. The invention defined in claim 4 and a restricted exhaust passage connecting said inner area chamber to exhaust; said annular seal providing at least a more restricted flow passage when said shift valve means is upshifted operative on the supply of downshift fluid to pressurize said outer chamber and exhaust said inner passage and when said shift valve means is downshifted said annular seal providing a less restricted passage than said exhaust passage to pressurize both chambers.

6. The invention defined in claim 4 and said annular seal means being a sliding seal between a piston on one end portion and a cylinder on the other end portion.

7. The invention defined in claim 4 and said annular seal means being an annular face seal on said end portions.

8. In a transmission; multiratio gear means having an input, output, low drive fluid operated means for establishing a low ratio drive between said input and output and high drive fluid operated means for establishing a high ratio drive between said input and output; a source of fluid under pressure; governor means connected to said source and said output providing a governor pressure varying with output speed; torque demand means responsive to engine torque demand providing a torque demand signal varying with torque demand; shift control means including shift valve means connected to said source, said low and high drive means, said governor means and said torque demand means, operative in a downshift position to connect said source to said low drive fluid operated means operative in an upshift position to connect said source to said high drive fluid operated means and biased in an upshift direction by said governor signal and in a downshift direction by said torque demand signal at a high value when downshifted and a lower value when upshifted to provide an upshift to provide automatic shifting at increasing and higher upshift speeds and lower downshift speeds, and manual downshift means having manual downshift fluid supply means selectively manually controlled to supply downshift pressure, first downshift chamber means having a first area operatively connected to said shift valve means operative in response to said downshift pressure on said first area when said shift valve means is upshifted to downshift said shift valve means at a higher speed than said automatic downshift, second downshift chamber means having a second area operatively connected to said shift valve means operative in response to said downshift pressure on said first and second areas when said shift valve means is downshifted to prevent an upshift until a speed substantially higher than said manual downshift speed, restricted exhaust means connecting said second downshift chamber means to exhaust in the upshift position and the downshift position of said shift valve means and variable restricted supply means connected to said manual downshift fluid supply means and said first and second chamber means operative when said shift valve means is in an upshift position to connect said manual downshift fluid supply means to said first chamber means so downshift pressure acts in said first chamber means on said first area for a downshift and through a restriction smaller than said exhaust restriction to said second chamber means so downshift pressure does not act in said second chamber means on said second area and when said shift valve means is in a downshift position to connect said manual downshift fluid supply means to said first chamber to act on said first area and through a passage larger than said exhaust restriction so downshift pressure does act in said second chamber means on said second area to act on both areas to hold said shift valve means upshifted until a speed substantially higher than said manual downshift speed.

9. In a transmission; multiratio gear means having an input, output, low drive fluid operated means for establishing a low ratio drive between said input and output and high drive fluid operated means for establishing a high ratio drive between said input and output; a source of fluid under pressure; governor means connected to said source and said output providing a governor pressure varying with output speed; torque demand means responsive to engine torque demand providing a torque demand signal varying with torque demand; shift control means including shift valve means connected to said source, said low and high drive means and said governor means, having an end portion, operative in a downshift position to connect said source to said low drive fluid operated means, biased in an upshift direction by said governor signal and operative in an upshift position to connect said source to said high drive fluid operated means and providing a small automatic shift hysteresis, control valve biasing means having an end portion engaging said end portion of said shift valve means continuously during automatic shifting to transmit a bias, connected to said torque demand means for control by said torque demand means to provide a torque demand bias opposing said governor bias and manual downshift means having a cylinder in said end portion of said shift valve means and a piston on said end portion of said control valve biasing means fitting into said cylinder forming a chamber, restricted exhaust means continuously connecting said chamber to exhaust, said piston and cylinder having restriction means providing a smaller restricted flow passage than said restricted exhaust passage for flow to said chamber when said shift valve means and said control biasing means are both upshifted and a larger flow passage than said restricted exhaust passage for flow to said chamber when said control biasing valve means is upshifted and said shift valve means is downshifted, said end portion of said shift valve means having a first external area upstream of said smaller restriction and a second area in said chamber and manual supply means connected to said source and said manual downshift means operative to position said biasing control means in the upshift position, when said shift valve means is in the upshift position to supply a regulated manual fluid pressure to act on said first external area, flow through said smaller restriction to said chamber and to said restricted exhaust to provide not more than a very small pressure acting on said second area to provide a downshift at an output speed to a lower ratio drive in which the input speed is the maximum power speed of the engine and operative after a downshift of said shift valve means to act on said first area flow through said larger flow passage to said chamber and to said restricted exhaust to provide said regulated manual fluid pressure in said chamber acting on said second area to act on both areas to hold said shift valve means downshifted up to the maximum operative engine braking engine speed.

10. In a transmission; multiratio gear means having an input, output, low drive fluid operated means for establishing a low ratio drive between said input and output and high drive fluid operated means for establishing a high ratio drive between said input and output; a source of fluid under pressure; governor means connected to said source and said output providing a governor pressure varying directly with output speed; torque demand means responsive to engine torque demand providing a torque demand signal varying inversely with torque demand; shift control means including shift valve means connected to said source, said low and high drive means and said governor means having an end portion and operative in a downshift position to connect said source to said low drive fluid operated means, biased in an upshift direction by said governor signal and operative in an upshift position to connect said source to said high drive fluid operated means and providing a small automatic shift hysteresis, biasing control means having an end portion engaging said end portion of said shift valve means continuously during automatic shifting to transmit a bias, connected to said torque demand means for control by said torque demand means to provide an upshift opposing bias increasing at a low rate with torque demand and a downshifting bias increasing at a higher rate to the same value to bias said shift valve means in a downshift direction to provide automatic shifting in which the upshift and downshift speeds both increase and converge and are separated only by said small automatic shift hysteresis at full throttle and manual downshift means having a cylinder in said end portion of said shift valve means and a piston on said end portion of said control biasing means fitting into said cylinder forming a chamber, restricted exhaust means continuously connecting said chamber to exhaust, said piston and cylinder having restriction means providing a smaller restricted flow passage than said restricted exhaust passage for flow to said chamber when said shift valve means and said control biasing means are both upshifted and a larger flow passage than said restricted exhaust passage for flow to said chamber when said control biasing valve means is upshifted and said shift valve means is downshifted, said end portion of said shift valve means having a first external area upstream of said smaller restriction and a second area in said chamber and manual supply means connected to said source and said manual downshift means operative to position said biasing control means in the upshift position, when said shift valve means is in the upshift position to supply a regulated manual fluid pressure to act on said first external area, flow through said smaller restriction to said chamber and to said restricted exhaust to provide not more than a very small pressure acting on said second area to provide a downshift at an output speed to a lower ratio drive in which the input speed is the maximum power speed of the engine and operative after a downshift of said shift valve means to act on said first area flow through said larger flow passage to said chamber and to said restricted exhaust to provide said regulated manual fluid pressure in said chamber acting on said second area to hold said shift valve means downshifted up to the maximum operative engine braking engine speed.

11. In a transmission; multiratio gear means having an input, an output and fluid operated means for selectively establishing a low ratio drive and a high ratio drive; source means providing fluid under pressure; governor means connected to said gear means providing a governor signal varying with speed; torque demand signal means responsive to engine torque demand providing a torque demand signal varying with torque demand; shift control means operatively connected to said source means, said governor means, said torque demand signal means and said fluid operated means controlled by said governor signal and torque demand signal for automatic upshifting at higher speeds with increasing torque demand to upshift position and downshifting at lower speeds to downshift position and operative to control the supply of fluid between said source and said fluid operated means to establish said low ratio drive in downshift position and said high ratio drive in upshift position; said shift control means including a shift valve assembly having a bore, a shift valve element and a control valve element both slidable in said bore between upshift and downshift position and each having an adjacent end portion, governor bias means responsive to said governor signal to bias said shift valve element to upshift position, torque demand biasing means responsive to said torque demand signal biasing said control valve element to downshift position and to continuously engage said adjacent end portions for movement of said valve elements as a unit during said automatic shifting; manual downshift signal means manually selectively providing a fluid pressure manual downshift signal to said bore between said adjacent end portions in all positions of said valve elements; and downshift area means having a control portion on each adjacent end portion located within said bore and cooperating only with each other for operation responsive to said downshift signal in said bore to position said control valve element in upshift position and provide a large area exposed to said downshift signal for a large downshift bias when said shift valve element is in said downshift position and a small area exposed to said downshift signal for a small downshift bias when said shift valve element is in said upshift position to provide manual shift hysteresis by manual downshift signal pressure for upshifts up to a predetermined speed and downshifts at a lower speed.

12. In a transmission; multiratio gear means having an input, an output and fluid operated means for selectively establishing a low ratio drive and a high ratio drive; source means providing fluid under pressure; governor means connected to said gear means providing a governor signal varying with speed; torque demand signal means responsive to engine torque demand providing a torque demand signal varying with torque demand; shift control means operatively connected to said source means, said governor means, said torque demand signal means and said fluid operated means controlled by said governor signal and torque demand signal for automatic upshifting at higher speeds with increasing torque demand to upshift position and downshifting at lower speeds to downshift position and operative to control the supply of fluid between said source and said fluid operated means to establish said low ratio drive in downshift position and said high ratio drive in upshift position; said shift control means including a shift valve assembly having a bore, a shift valve element and a control valve element both slidable in said bore between upshift and downshift position and each having an adjacent end portion, governor bias means responsive to said governor signal to bias said shift valve element to upshift position, torque demand biasing means responsive to said torque demand signal biasing said control valve element to downshift position and to continuously engage said adjacent end portions for movement of said valve elements as a unit during said automatic shifting; manual downshift signal means manually selectively providing a manual downshift fluid pressure to said bore between said adjacent end portions in all positions of said valve elements; and downshift means having controlled area means on said adjacent end portion of said shift valve element and area control means on said adjacent end portion of said control valve element cooperating with only each other and operative in response to said downshift pressure in said bore to position said control valve element in said upshift position to provide when said shift valve element is in upshift position a small area of said controlled area means exposed to downshift pressure in said bore between said valve elements for a small downshift bias and to provide when said shift valve element is in downshift position a larger area of said controlled area means exposed to downshift pressure in said bore for a large downshift bias to provide manual shift hysteresis by manual downshift pressure for upshifts at high speed and downshifts at a lower speed.

13. In a transmission; multiratio gear means having an input, an output and fluid operated means for selectively establishing a low ratio drive and a high ratio drive; source means providing fluid under pressure; governor means connected to said gear means providing a governor signal varying with speed; torque demand signal means responsive to engine torque demand providing a torque demand signal varying with torque demand; shift control means operatively connected to said source means, said governor means, said torque demand signal means and said fluid operated means controlled by said governor signal and torque demand signal for automatic upshifting at higher speeds with increasing torque demand to upshift position and downshifting at lower speeds to downshift position and operative to control the supply of fluid between said source and said fluid operated means to establish said low ratio drive in downshift position and said high ratio drive in upshift position; said shift control means including a shift valve assembly having a bore, a shift valve element and a control valve element both slidable in said bore between upshift and downshift position and each having an adjacent end portion, governor bias means responsive to said governor signal to bias said shift valve element to upshift position, torque demand biasing means responsive to said torque demand signal biasing said control valve element to downshift position and to continuously engage said adjacent end portions for movement of said valve elements as a unit during said automatic shifting; manual downshift signal means manually selectively providing a manual downshift fluid pressure to said bore between said adjacent end portions in all positions of said valve elements; and downshift means having controlled area means with a first area means exposed to pressure in said bore at all times and a second area means on said adjacent end portion of said shift valve element, area control means with a third area means on said adjacent end portion of said control valve element, a restricted exhaust from said second area means, restriction means for flow from said first area means to said second area means having a more restricted passage than said restricted exhaust when said shift valve is upshifted and a less restricted passage than said restricted exhaust when said shift valve is downshifted and operative in response to said downshift pressure in said bore acting on said third area means to position said control valve element in said upshift position to provide when said shift valve element is in upshift position downshift pressure acting on said first area means, flowing through said more restricted passage over said second area means and to said restricted exhaust to provide not more than a low pressure acting on said second area means for a small downshift bias and to provide when said shift valve element is in downshift position downshift pressure acting on said first area means and flowing through less restricted passage, over said second area means and to said restricted exhaust to provide downshift pressure on said second area means for a large downshift bias to provide manual hysteresis by manual downshift pressure for upshifts at high speed and downshifts at a lower speed.

* * * * *